(12) United States Patent
Spitler et al.

(10) Patent No.: US 8,235,442 B2
(45) Date of Patent: Aug. 7, 2012

(54) CONSOLE LID SLIDE RAIL ATTACHMENT

(75) Inventors: Nicholas Spitler, Farmington Hills, MI (US); Nobutaka Takeuchi, Saitama (JP); Marius Cociuba, Dearborn, MI (US)

(73) Assignee: Nissan North America, Inc., Franklin, TN (US)

( * ) Notice: Subject to any disclaimer, the term of this patent is extended or adjusted under 35 U.S.C. 154(b) by 249 days.

(21) Appl. No.: 12/635,739

(22) Filed: Dec. 11, 2009

(65) Prior Publication Data

US 2011/0140475 A1 Jun. 16, 2011

(51) Int. Cl.
*B60R 13/00* (2006.01)
(52) U.S. Cl. .................................. 296/24.34; 296/37.8
(58) Field of Classification Search .............. 296/24.34, 296/37.8, 37.16; 220/812, 813, 817; *B60R 13/00*
See application file for complete search history.

(56) References Cited

U.S. PATENT DOCUMENTS

| | | | | |
|---|---|---|---|---|
| 3,044,507 A * | 7/1962 | Esposito | | 83/166 |
| 4,934,750 A * | 6/1990 | Eichler et al. | | 296/37.8 |
| 6,045,173 A * | 4/2000 | Tiesler et al. | | 296/37.8 |
| 6,305,739 B1 * | 10/2001 | Corona | | 296/165 |
| 6,419,314 B1 * | 7/2002 | Scheerhorn | | 297/188.19 |
| 6,719,367 B2 * | 4/2004 | Mic et al. | | 297/188.19 |
| 7,029,049 B2 * | 4/2006 | Rockafellow et al. | | 296/37.8 |
| 7,163,248 B2 * | 1/2007 | Adams et al. | | 296/24.34 |
| 7,192,070 B2 * | 3/2007 | Radu et al. | | 296/24.34 |
| 7,234,746 B2 * | 6/2007 | Sakakibara et al. | | 296/24.34 |
| 7,296,839 B2 * | 11/2007 | Scheerhorn | | 296/37.8 |
| 7,530,615 B2 * | 5/2009 | Ogura | | 296/24.34 |
| 7,614,674 B2 * | 11/2009 | Shiono et al. | | 296/24.34 |
| 7,766,408 B2 * | 8/2010 | Lota et al. | | 296/37.1 |
| 7,770,953 B2 * | 8/2010 | Koarai | | 296/24.34 |
| 7,784,843 B2 * | 8/2010 | Lota et al. | | 296/24.34 |
| 8,074,832 B2 * | 12/2011 | Fujiwara et al. | | 220/811 |
| 2006/0097532 A1 * | 5/2006 | Adams et al. | | 296/24.34 |
| 2007/0132284 A1 * | 6/2007 | Ekladyous et al. | | 297/188.17 |
| 2009/0278370 A1 * | 11/2009 | DePue | | 296/24.34 |

OTHER PUBLICATIONS

Photographs of 2006 Toyota Tundra console and parts of same when disassembled.

* cited by examiner

*Primary Examiner* — Glenn Dayoan
*Assistant Examiner* — Pinel Romain
(74) *Attorney, Agent, or Firm* — Young Basile Hanlon & MacFarlane, P.C.

(57) ABSTRACT

Embodiments of a vehicle console comprise a base structure defining a cavity and having an opening permitting access to the cavity, a lid having a surface area sufficient to cover at least a portion of the opening when the lid is in a closed position at the base structure, a hinge member connected between the base structure and the lid and configured to allow rotational movement of the lid between the closed position and an open position, a slide coupled to the lid and configured to allow translational movement of at least a portion of the lid between a retracted position and an extended position spaced apart from the retracted position and a slide mounting member including a first mounting portion and a second mounting portion, the first mounting portion coupled to the hinge member and the second mounting portion coupled to the slide.

19 Claims, 4 Drawing Sheets

CONSOLE LID SLIDE RAIL ATTACHMENT

FIELD OF THE INVENTION

The present invention relates to the field of vehicle consoles and rail attachment mechanisms for vehicle consoles.

BACKGROUND

Automotive vehicles are often equipped with a center console positioned between individual front driver and passenger seats and sometimes among the rear seats. Center consoles are provided primarily for storage purposes and typically include a pivotally movable lid that opens up into one or more storage bins, which are usually sufficiently large to house music CD's, maps, keys and other items. Some lids are also slidingly movable along the center console so as to provide a workspace for a passenger.

SUMMARY

Embodiments of a vehicle storage console are disclosed herein. One embodiment comprises a base structure defining a cavity and having an opening permitting access to the cavity, a lid having a surface area sufficient to cover at least a portion of the opening when the lid is in a closed position at the base structure, a hinge member connected between the base structure and the lid and configured to allow rotational movement of the lid between the closed position and an open position, a slide coupled to the lid and configured to allow translational movement of at least a portion of the lid between a retracted position and an extended position spaced apart from the retracted position and a slide mounting member including a first mounting portion and a second mounting portion, the first mounting portion coupled to the hinge member and the second mounting portion coupled to the slide.

BRIEF DESCRIPTION OF THE DRAWINGS

The description herein makes reference to the accompanying drawings wherein like reference numerals refer to like parts throughout the several views, and wherein.

DETAILED DESCRIPTION

Embodiments of a vehicle console 10 are described with respect to FIGS. 1-7.

Figure 1:
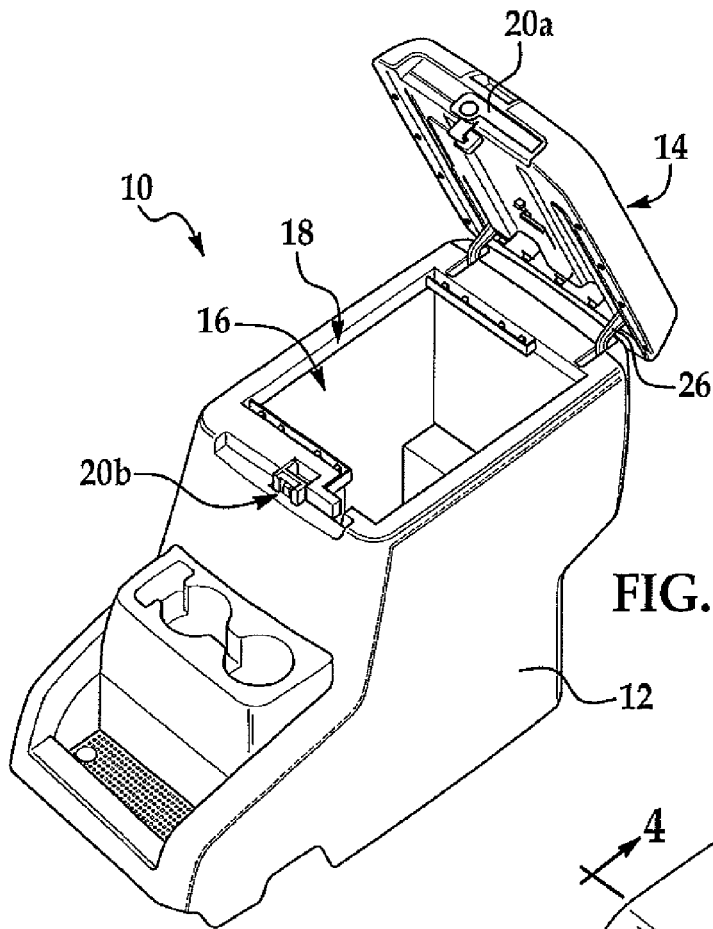
FIG. 1 is a perspective view of a vehicle console according to one embodiment of the invention with a lid in an open position.
Figure 2:
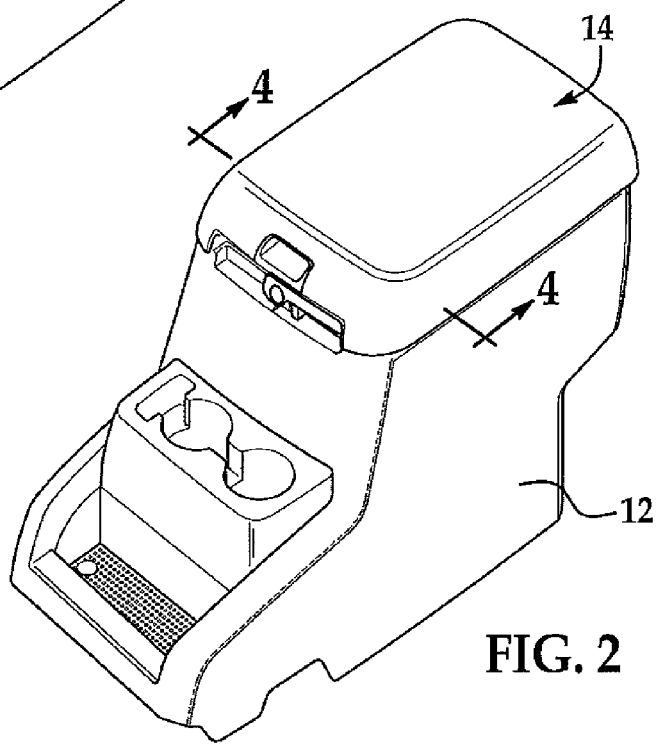
FIG. 2 is a perspective view of the vehicle console according to FIG. 1 with the lid in a closed, retracted position.
Figure 3:
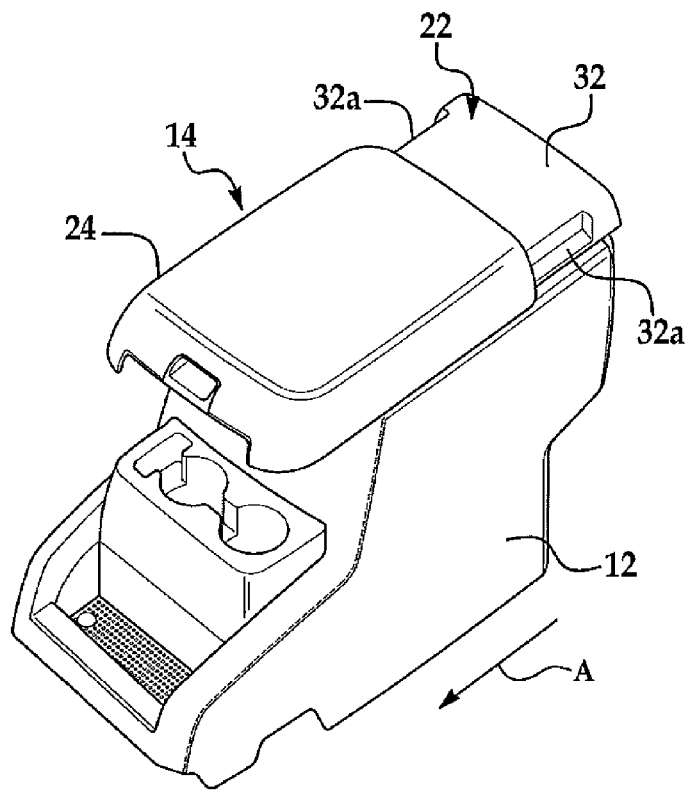
FIG. 3 is a perspective view of the vehicle console according to FIG. 1 with the lid in an extended position.

Referring first to FIGS. 1-3, one vehicle console 10 includes a base structure 12 and a lid 14. Lid 14 moves between an open position and a closed position and a retracted and extended position as described in detail hereinafter.

In FIG. 1, lid 14 is shown in the open position with respect base structure 12. In this position, a compartment or cavity 16 and an opening 18 permitting access to cavity 16 are shown. Although only one cavity 16 is shown, more than one cavity can be incorporated into embodiments of the invention. As is typical, one or more cup holders can be provided either integral with console 10 or extending from console 10. Lid 14 of console 10 generally has a latch 20a that engages with a corresponding engaging portion 20b in base structure 12 so as to secure items in cavity 16 and that disengages with engaging portion 20b so as to allow access to cavity 16. Latch 20a and engaging portion 20b can be of any conventional design. Base structure 12 generally comprises a plastic material as known to those skilled in the art.

Lid 14 has a surface area sufficient to cover at least a portion of opening 18 when lid 14 is in a closed position. As shown in FIG. 2, lid 14 is in the closed position and completely covers opening 18. Lid 14 undergoes rotational movement between the closed and open positions with respect to base structure 12 through the use of a hinge member 26. The position in FIG. 2 is also referred to as the retracted position of lid 14.

Figure 7:
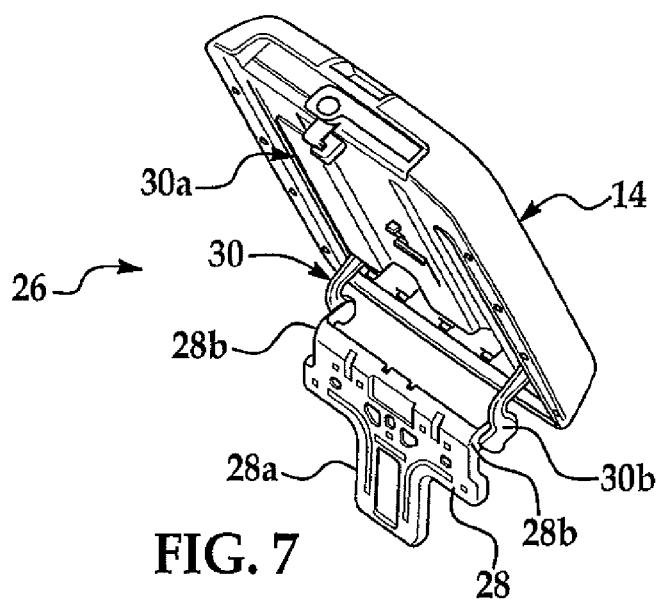
FIG. 7 is a perspective view of a hinge member according to one embodiment of the invention.

Hinge member 26 is shown in additional detail in FIG. 7. Hinge member 26 has a fixed portion 28 connected to base structure 12 and a movable portion 30 connected to lid 14. More specifically, fixed portion 28 is a generally Y-shaped structure whose body 28a is fixedly mounted to base structure 12 by screws, welding, etc. and whose fixed arms 28b support movable portion 30. As shown in FIG. 1, fixed portion 28 is affixed to a rear portion of base structure 12 with respect to the travel direction of the vehicle and is concealed by a rear wall of cavity 16 so as to form a relatively uniform interior appearance for cavity 16.

Movable portion 30 of hinge member 26 is pivotable with respect to fixed portion 28 so as to move the lid between the closed position and the open position. In the disclosed embodiment of FIG. 7, movable portion 30 comprises two movable arms 30a extending in a direction away from fixed portion 28 and along at least a portion of slide 38 as described hereinafter. Ends of movable arms 30a form retainers 30b that are pivotal with respect to fixed arms 28a of fixed portion 28 such that movable arms 30a close lid 14 over opening 18 and open lid 14 to the limit provided by the stops of retainers 30b as they contact a surface of fixed arms 28b. Hinge member 26 is generally made of steel or other material capable of withstanding the stresses associated with frequent opening and closing movements.

Although only one type of hinge member 26 is shown by example, various hinge members as known to those skilled in the art can be used with embodiments of the invention when provided with the teachings herein.

Lid 14 includes an inner lid 22 and an outer lid 24 configured for translational movement with respect to each other. That is, as shown in FIG. 2, inner lid 22 and outer lid 24 are aligned over opening 18 in the retracted position. FIG. 3 shows the extended position of lid 14. In the extended position, outer lid 24 slides in the direction of arrow A with respect to inner lid 22. Although hinge member 26 is shown mounted to the rear of base structure 12 with respect to the forward travel direction of the vehicle such that translational movement of outer lid 24 with respect to base structure 12 and inner lid 22 in the direction of arrow A and back is along the longitudinal direction of the vehicle, this configuration is not necessary. Instead, movement from the retracted position to the extended position in the direction should merely be in a direction away from a pivot point of hinge member 26, here defined by the connection of fixed arms 28c and retainers 30b, regardless of the mounting position of hinge member 26.

Figure 4:
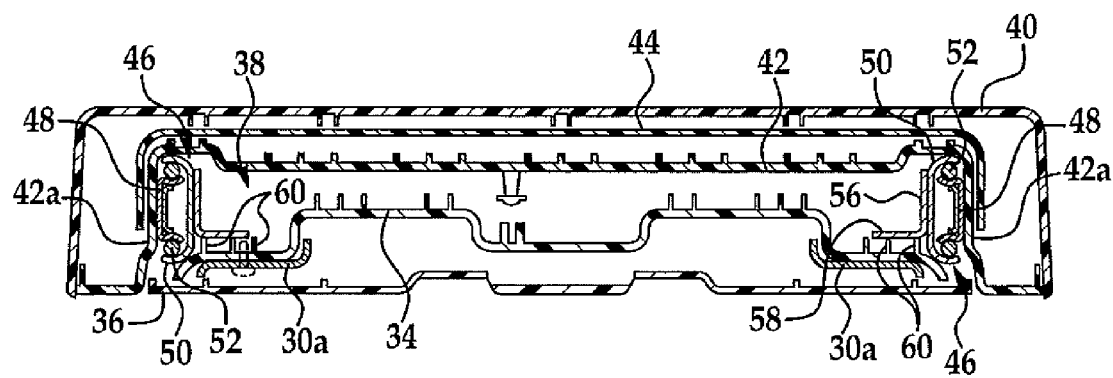
FIG. 4 is a cross-sectional view of the vehicle console according to FIG. 2 along the line 4-4.

Referring now to FIGS. 3 and 4, inner lid 22 is generally shaped as a parallelepiped and includes an outer surface 32 with a substantially flat top defining a plane of lid 14 and a mounting surface 34. Mounting surface 34 is coupled to hinge member movable portion 30 by arms 30a as discussed in more detail hereinafter. Through this connection of inner lid 22 to hinge member 26, lid 14 moves between the open position and the closed position respectively shown in FIGS. 1 and 2.

In the inner lid 22, mounting surface 34 is coupled to outer surface 32 at least at an end of inner lid 22 adjacent hinge member 26 according to known methods of joining parts. While mounting surface 34 extends substantially the entire length of outer lid 24, outer surface 32 does not. This is because the distal end of inner lid 22 remains covered by outer lid 24 at all times. Accordingly, outer surface 32 is not shown in FIG. 4.

A sealing plate 36 is located at a bottom of inner lid 22 so as to hide components internal to lid 14 when lid 14 is in an open position as shown in FIG. 1. Outer surface 32, mounting surface 34 and sealing plate 36 are generally plastic formed by known methods such as injection molding.

Outer lid 24 comprises at least two pieces affixed together by bolts, screws, snap-fit, etc., to form an inner space 38 substantially conforming to the shape of inner lid 22. That is, like inner lid 22, outer lid 24 comprises an outer surface 40 and a mounting surface 42.

Outer surface 40 extends past the length of inner lid 22 in the direction of arrow A from hinge member 26 and extends the width of inner lid 22 past an outer edge of inner lid mounting surface 34 to form a substantially planar top surface and a front facing surface at the end of outer lid 24 opposite hinge member 26 so as to conceal the end of inner lid 22 opposite hinge member 26 and provide an external surface for lid 14. Latch 20a is conventionally formed in front facing surface of outer surface 40 as shown in FIGS. 1-3. The planar top surface of outer surface 40 is a work surface for a passenger in the vehicle.

FIG. 4 shows only the underlayer of outer surface 40. Outer surface 40, however, conventionally includes vinyl or other material covering the underlayer, either with or without additional padding, to form an aesthetically-pleasing external surface. The covering material is formed as part of outer surface 40 according to known methods.

Outer lid mounting surface 42 extends normal to a plane of lid 14 at a position past the outer edge of inner lid mounting surface 34 to form opposing, substantially perpendicular mounting walls 42a for mounting of respective slides 46 discussed hereinafter. At lower ends of mounting walls 42a, mounting surface 42 extends outwardly from inner space 38 to form bottom surfaces 42b generally parallel to a plane of lid 14 defined by sealing plate 36 so as to join with outermost edges of outer lid outer surface 40.

Optionally, outer lid 24 includes a support member 44 for additional rigidity when lid 14 is in the extended position with outer lid 24 pulled or pushed away from base structure 12. Support member 44, when present, extends generally from an area near hinge member 26 in the direction of arrow A and has outside edges extending normal to a plane of lid 14 at least partially along an outer surface of mounting walls 42a of outer lid mounting surface 42 as shown in FIG. 4. Outer surface 40, excluding any covering material, mounting surface 42 and support member 44 are generally plastic formed by known methods such as injection molding.

Although not shown in FIG. 4, inner lid outer surface 32 generally conforms to the interior surface of outer lid mounting surface 42. As shown in FIG. 3, however, longitudinally-extending cut-outs 32a in opposing surfaces of inner lid outer surface 32 provide spaces for outer rail 48 when lid 14 is in the retracted position.

A stop is required to prevent extension of outer lid 24 beyond an end of inner lid 22. As just one example of such a stop, instead of inner lid outer surface 32 and outer lid mounting surface 42 each forming substantially planar areas with respect to the other, inner lid outer surface 32 could include a longitudinally-extending groove facing a tongue extending from outer lid mounting surface 42. In such a manner, outer lid 24 could extend until its tongue reaches the end of the groove of inner lid 22, thus stopping movement in the direction of arrow A at the extended position of lid 14. Other ways of preventing outer lid 24 from extending beyond the end of inner lid 22 are possible and within the skill of those in the art provided with the teachings herein.

Figure 5:
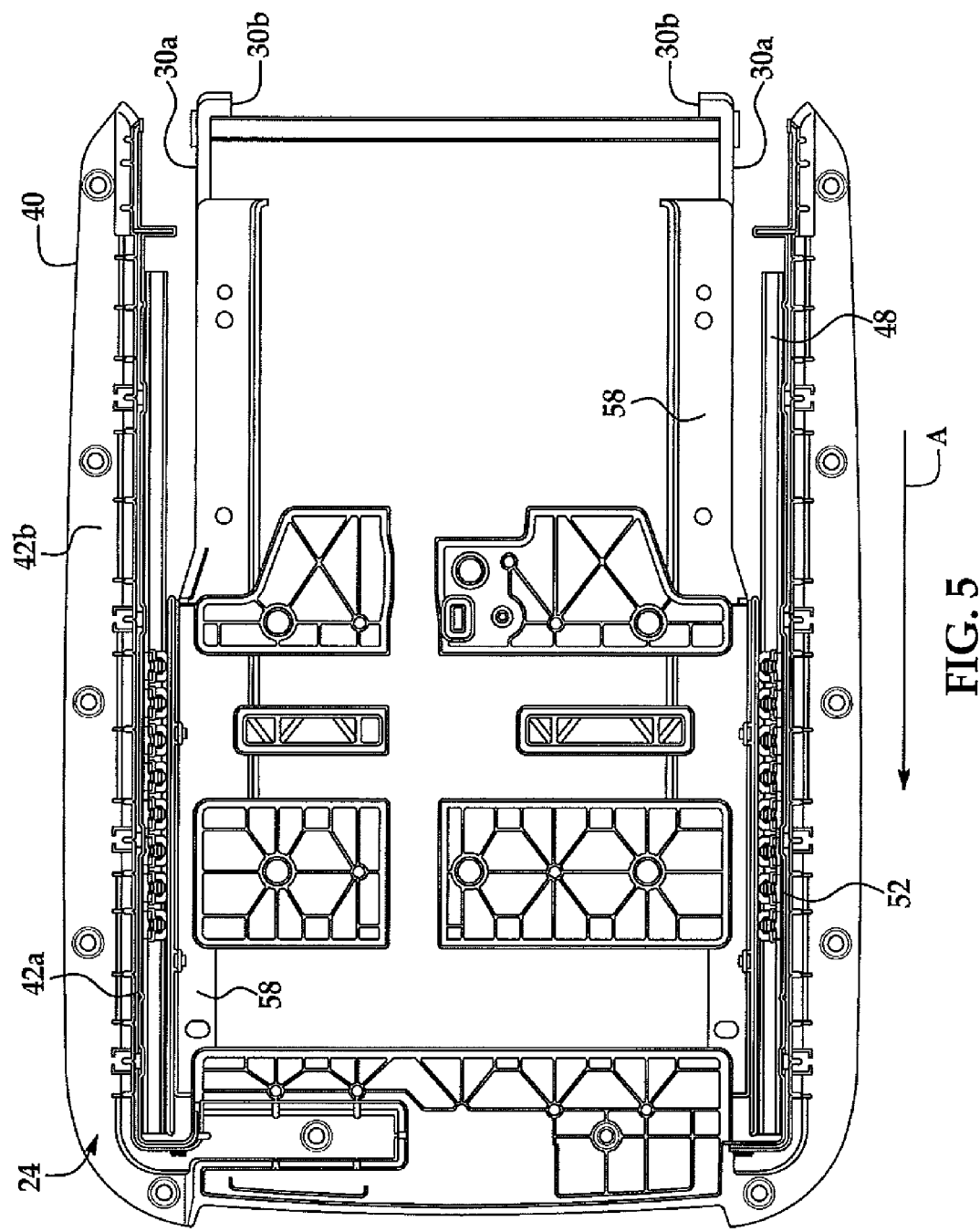
FIG. 5 is partial plan view of a bottom surface of the vehicle console according to one embodiment of the invention with the inner lid and inner rail omitted.
Figure 6:
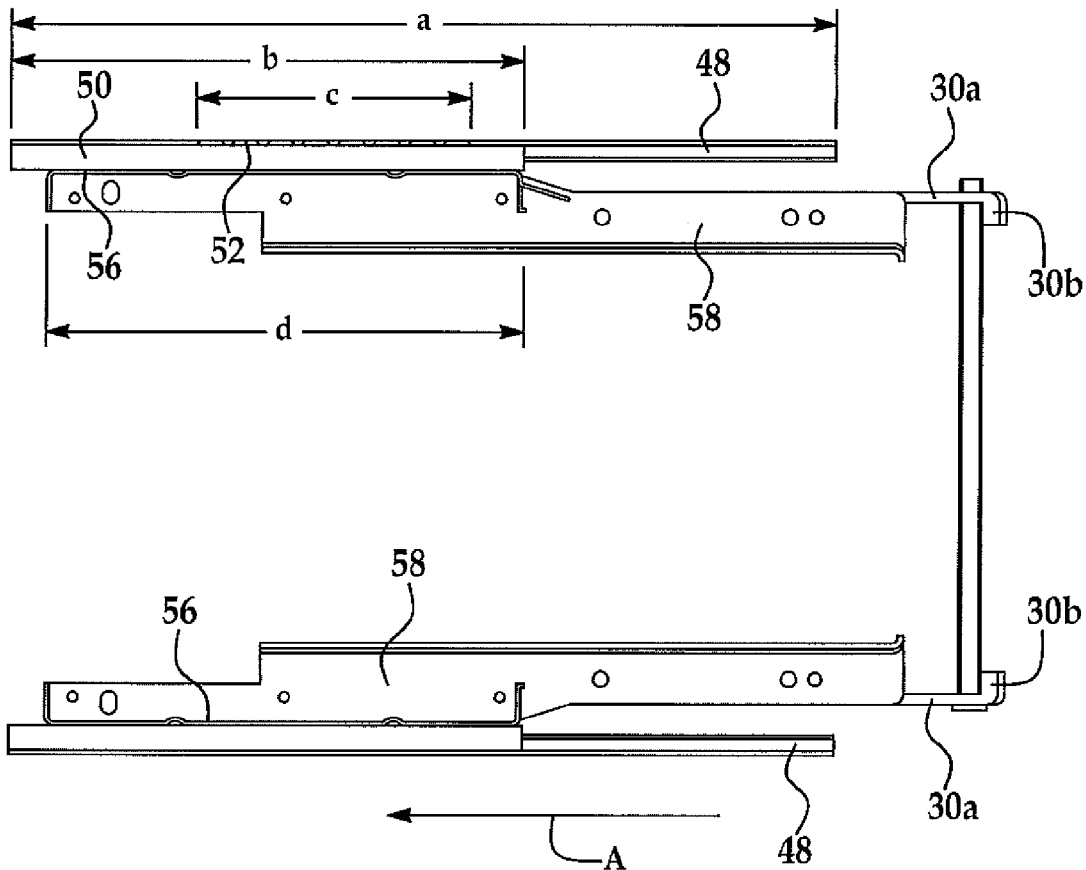
FIG. 6 is a partial plan view according to FIG. 5 with all structure removed except the slide, hinge member and slide mounting member.

As mentioned briefly above, slides 46 are respectively mounted to mounting walls 42a of outer lid 24. More specifically, and as shown in FIGS. 4-6, an outer rail 48 of each slide 46 is fixedly mounted to one mounting wall 42a of outer lid mounting surface 42. An inner rail 50 of each slide 46 is fixedly coupled to inner lid 22 such that sliding movement of outer rails 48 with respect to inner rails 50 results in translational movement of outer lid 24 with respect to inner lid 22 in the direction of arrow A to the extended position of lid 14 shown in FIG. 3 and then back to the retracted position of lid 14 shown in FIG. 2. In this embodiment, each slide 46 includes a ball bearing race 52 between outer rail 48 and inner rail 50. Outer rails 48 are fixedly mounted to respective mounting walls 42a by any suitable means. Outer rails 48, inner rails 50 and ball bearing races 52 are generally made of a metallic material such as steel, but any material that can withstand frequent movement and having sufficient strength for the application can be used.

Each inner rail 50 extends in the longitudinal direction with respect to the vehicle (that is, along the line defined by arrow A) and is substantially perpendicular with respect to a plane of lid 14. Since inner rails 50 form substantially perpendicular surfaces with respect to inner lid mounting surface 34, inner rails 50 are not directly coupled to inner lid mounting surface 34. Instead, a respective longitudinally-extending bracket, or slide mounting member 54, affixes slides 46 to inner lid 22. Each slide mounting member 54 includes a first mounting flange, or portion, 56 and a second mounting flange, or portion, 58 at an angular offset with respect to each other. In this embodiment, first mounting portion 56 and second mounting portion 58 are substantially perpendicular to each other.

Each first mounting portion 58 is coupled to hinge member 26, more specifically to movable portion 30 of hinge member 26. As can be seen from FIGS. 4-7, movable arms 30a of hinge member 30 longitudinally extend along opposing outer edges of inner lid mounting surface 34. Similarly, each first mounting portion 58 of slide mounting member 54 longitudinally extends along opposing outer edges of inner lid mounting surface 34. Accordingly, inner lid 22 is firmly affixed to both hinge member 26 and slide mounting member 54 by sandwiching opposing outer edges of inner lid mounting surface 34 between each movable arm 30a of hinge member 26 and a respective first mounting portion 58 as shown in FIG. 4. Each of the outer edges of inner lid mounting surface 34 disposed between arms 30a and first mounting portions 58 can include reinforcement ribs 60 extending toward first mounting portions 58. Outer edges of inner lid mounting surface 34, movable arms 30a and first mounting portions 58 can be coupled together by fasteners 50 extending in a direction that is normal to a plane of lid 14.

Each second mounting portion 56 of slide mounting member 54 is affixed to a respective inner rail 50 by any suitable attachment means. Slide mounting members 54 are preferably steel, but can be of any other material that will provide structural support for outer lid 24 when lid 14 is in the extended position as shown in FIG. 3.

As mentioned above, longitudinally-extending cut-outs 32a in opposing surfaces of inner lid outer surface 32 provide spaces for outer rail 48 when lid 14 is in the retracted position. This is more clearly described by reference to FIGS. 5 and 6. As shown therein, outer rail 48 extends for a length a, which is substantially the length of outer lid mounting surface 42. However, inner rail 50 has a shorter length b and is arranged such that outer rail 48 extends rearward of inner rail 50 with respect to the direction indicated by arrow A when lid 14 is in the retracted position. Ball bearing race 52, located between outer rail 48 and inner rail 50, has a length c shorter than both rails and is located rearward with respect to the length b of inner rail 50.

Slide mounting members 54 conform to the shape of cut-outs 32a of inner lid outer surface 32. That is, both of first mounting portion 58 and second mounting portion 56 of a slide mounting member 54 do not extend for the same length. While each second mounting portion 56 extends substantially the entire length of inner lid 22 along its respective connection to movable arms 30a of hinge member 26, second mounting portions 56 conform to the shape of cut-outs 32a at the ends closest to hinge member 26. In this area, slide mounting members 54 do not include first mounting portions 58. Instead, at the ends of cut-out portions 32a, first mounting portions 58 are included for a length d to support inner rail 50. First mounting portions 58 extend substantially the length b of inner rail. That is, the length d is almost equal to the length b.

Lid 14 moves between the open position and the closed position by the coupling of inner lid 22 to arms 30a of hinge member movable portion 30, while lid 14 moves from the retracted position to the extended position by sliding of outer lid 24 with respect to inner lid 22 by their respective connections to outer rails 48 and inner rails 50 of slides 46. While the illustrated embodiment shows a configuration where the pivoting point of hinge member 26 is arranged in a rear position of console 10 with respect to the forward vehicle travel direction, and the direction of sliding by arrow A is toward the front of the vehicle and away from hinge member 26, this is not necessary. Hinge member 26 can be arranged so that the pivoting point for the opening and closing of lid 14 is in any orientation with respect to opening 18. The only requirement is that the direction of sliding of outer lid 24 with respect to inner lid 22 into the extended position occurs in a direction away from the pivoting point of hinge member 26.

Slides 46 as illustrated are mounted perpendicular to a plane of lid 14, that is, they are mounted vertically. This vertical orientation is the preferred orientation because it allows for maximum loading of slides 46 and lid 14, but it is not necessary. Some sacrifice in rigidity is experienced when slides 46 are oriented at other angles, such as an acute angle. However, the presence of slide mounting members 54, and the resulting disposal of a portion of inner lid 22 between hinge member 26 and slide mounting members 54, provides increased rigidity to support console 10 in the lid extended positions even where slides 46 are so oriented.

Slide mounting members 54 are illustrated as brackets with two flanges, or mounting portions 58, 56, perpendicular to each other. One benefit of this arrangement is that fasteners 62 are easily installed in a direction normal to a plane of lid 14 to hold inner lid mounting surface 34, movable arms 30a of hinge member 26 and first mounting portions 58 of slide mounting members 54 together. More particularly, tool clearance is not an issue in the installation of fasteners 62 in this arrangement. However, a perpendicular arrangement is not necessary for mounting portions 56, 58 of slide mounting members 54. For example, if slides 46 are oriented other than substantially normal to a plane of lid 14 as described and shown, second mounting portion 56 could be aligned with the new angle of slide inner rail 50 while first mounting portion 58 could remain substantially parallel with the plane of lid 14.

Accordingly, while the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A console for an interior of a vehicle, comprising:
   a base structure defining a cavity and having an opening permitting access to the cavity;
   a lid having an outer lid and an inner lid having a surface area sufficient to cover at least a portion of the opening when the lid is in a closed position at the base structure;
   a hinge member connected between the base structure and the inner lid and configured to allow rotational movement of the lid between the closed position and an open position;
   a slide mounting member having a first mounting flange and a second mounting flange extending along a longitudinal side of a first mounting portion; and
   a slide coupled between the upper lid and the second mounting flange, the slide configured to allow translational movement of the outer lid between a retracted position and an extended position spaced apart from the retracted position, wherein the
   first mounting flange is connected to the inner lid such that a portion of the inner lid is positioned between the first mounting flange and the hinge member.

2. The console of claim 1 wherein the first mounting flange and the second mounting flange of the slide mounting member are substantially perpendicular to each other.

3. The console of claim 1 wherein the portion of the inner lid disposed between the first mounting flange and the hinge member includes reinforcement ribs extending toward the first mounting flange.

4. The console of claim 1 wherein the slide mounting portion connects the inner lid to the outer lid through the slide.

5. The console of claim 1 wherein the slide comprises an inner rail and an outer rail, the outer rail coupled to the outer lid and the inner rail coupled to the first mounting flange.

6. The console of claim 5 wherein the inner rail and the outer rail are arranged substantially vertically with respect to an orientation of the vehicle.

7. The console of claim 5 wherein the slide further comprises a ball bearing race between the inner rail and the outer rail.

8. The console of claim 1 wherein the hinge member comprises a fixed hinge portion coupled to the base structure and a movable hinge portion pivotable with respect to the fixed hinge portion about a pivot point so as to move the lid between the closed position and the open position; and wherein the portion of the inner lid is disposed between the first mounting flange and the movable hinge portion in a direction parallel to a plane of the lid.

9. The console of claim 8 wherein the portion of the inner lid disposed between the first mounting flange and the movable hinge portion includes reinforcement ribs extending toward the first mounting flange; and wherein the outer lid is movable between the retracted position and the extended position.

10. The console of claim 8 wherein the slide comprises an inner rail and an outer rail, the outer rail coupled to the outer lid and the inner rail coupled to the movable hinge portion of the hinge member.

11. The console of claim 8 wherein the movable hinge portion is coupled to the portion of the inner lid and to the first mounting flange by a fastener extending in a direction that is normal to a plane of the lid.

12. The console of claim 8 wherein the movable hinge portion of the hinge member extends for a majority of a length of the slide.

13. The console of claim 8 wherein the fixed hinge portion is located at an end of the base structure opposite from a movement direction of the outer lid.

14. The console of claim 13 wherein the end of the base structure at which the fixed hinge portion is located is a rear end of the base structure with respect to a forward traveling direction of the vehicle.

15. The console of claim 8 wherein a portion of the slide extends along an edge of the outer lid in a movement direction of the outer lid; and wherein the movable hinge portion extends along a majority of a length of the slide in the movement direction of the outer lid.

16. The console of claim 1 wherein a pivot point of the hinge member is at a rear end of the base structure with respect to a forward traveling direction of the vehicle and the slide is configured to allow movement of the outer lid from the retracted position to the extended position in the forward traveling direction.

17. The console of claim 5, wherein the inner rail and outer rail are positioned such that a width of each rail is vertical to a plane of the lid, with the inner rail spanning a mounting surface of the outer lid and a mounting surface of the inner lid.

18. The console of claim 1, wherein both the slide and the slide mounting member are sized and configured to be concealed when the lid is in the extended position.

19. The console of claim 1, wherein the portion of the inner lid positioned between the first mounting flange and the hinge member is in a plane parallel to a plane of the lid.

* * * * *